(12) United States Patent
Saumer et al.

(10) Patent No.: US 10,461,509 B2
(45) Date of Patent: Oct. 29, 2019

(54) FASTENING APPARATUS FOR RELEASABLY FASTENING A HOUSING TO A FASTENING RAIL

(71) Applicant: SICK AG, Waldkirch (DE)

(72) Inventors: Markus Saumer, Waldkirch (DE); Alexandra Disch, Waldkirch (DE)

(73) Assignee: SICK AG, Waldkirch (DE)

(*) Notice: Subject to any disclaimer, the term of this patent is extended or adjusted under 35 U.S.C. 154(b) by 0 days.

(21) Appl. No.: 15/908,055

(22) Filed: Feb. 28, 2018

(65) Prior Publication Data
US 2018/0269661 A1  Sep. 20, 2018

(30) Foreign Application Priority Data

Mar. 14, 2017 (EP) .................................... 17160825

(51) Int. Cl.
*H02B 1/052* (2006.01)
(52) U.S. Cl.
CPC ......... *H02B 1/0523* (2013.01); *H02B 1/0526* (2013.01)
(58) Field of Classification Search
CPC .... H02B 1/052; H02B 1/0523; H02B 1/0526; H01R 9/2608; H01R 13/514; H01R 9/26
See application file for complete search history.

(56) References Cited

U.S. PATENT DOCUMENTS

| | | | | |
|---|---|---|---|---|
| 5,334,054 A | * | 8/1994 | Conrad | H01R 9/2608 439/716 |
| 5,842,889 A | * | 12/1998 | Kollmann | H02B 1/052 439/716 |
| 7,170,758 B1 | | 1/2007 | Hanning et al. | |
| 9,276,333 B1 | * | 3/2016 | Wu | H01R 9/2608 |
| 9,374,924 B2 | * | 6/2016 | Boretti | H05K 7/1401 |
| 9,485,879 B2 | * | 11/2016 | Molnar | H05K 5/0026 |
| 2001/0051466 A1 | * | 12/2001 | Bechaz | H01R 9/2691 439/716 |
| 2006/0175489 A1 | * | 8/2006 | Portal | H01R 9/2608 248/215 |

FOREIGN PATENT DOCUMENTS

DE  195 04 762 A1  8/1996

OTHER PUBLICATIONS

Search Report dated Sep. 1, 2017 issued in corresponding European Application No. 17160825.0.

* cited by examiner

*Primary Examiner* — James Wu
(74) *Attorney, Agent, or Firm* — Nath, Goldberg & Meyer; Jerald L. Meyer; Stanley N. Protigal

(57) ABSTRACT

To enable an intuitive and inexpensive releasable fastening of a housing to a fastening rail, a fastening apparatus is provided for the releasable fastening of the housing to the fastening. A single-part lever mechanism is used for latching and unlatching the housing to and from the fastening rail. The lever mechanism has an actuation means that moves the lever mechanism into a latching position or into an unlatching position, a first lever arm that actuates a first hook provided in the housing in a first direction, and a second lever arm that actuates a second hook provided in the housing in a second direction. The first and second directions are opposite one another and the first and second lever arms are connected to one another via the actuation means such that a support section is formed that has a parabolic form having two parallel limbs.

10 Claims, 3 Drawing Sheets

FASTENING APPARATUS FOR RELEASABLY FASTENING A HOUSING TO A FASTENING RAIL

FIELD

The invention relates to a fastening apparatus for the releasable fastening of a housing to a fastening rail.

BACKGROUND

Electronic devices having their own housings that are not formed in all too voluminous a manner are preferably installed at a wall. The housing is here releasably fastened by a fastening apparatus to a fastening rail, in particular a top-hat rail or a sectional rail, provided at the wall, with the fastening apparatus comprising screws or clamps, for example.

With a screw fastening, suitable holes are required in the housing of the electronic units and in the fastening rail as well as nuts or suitable threaded bores so that the housing can be screwed to the fastening rail. The fastening and releasing of the housing to or from the fastening rail is awkward and complex when a screw fastening is used. The production of the screw fastening, in particular holes and a threaded bore at the housing and/or at the fastening rail, is furthermore complex and thus expensive.

With a clamp fastening, multi-part designs are used that, for example, comprise clamps for latching and unlatching the housing to and from the fastening rail, actuation means for actuating the clamps, and springs for tensioning the clamps. The fastening and releasing of the housing to or from the fastening rail by means of the clamping fastening is typically less intuitive and the provision of the clamping fastening at the housing is complex and complicated. The assembly of the multi-part construction of the clamp fastening to the housing is time-consuming and thus makes the construction expensive overall.

SUMMARY

It is therefore an object of the invention to provide a fastening apparatus for a releasable fastening of a housing to a fastening rail with which an intuitive and inexpensive releasable fastening can be achieved.

The object is achieved in accordance with the invention by a fastening apparatus for the releasable fastening of a housing to a fastening rail comprising a single-part lever mechanism for latching and unlatching the housing to or from the fastening rail, wherein the lever mechanism comprises an actuation means that moves the lever mechanism into a latching position or an unlatching position; a first lever arm that actuates a first hook provided in the housing in a first direction; and a second lever arm that actuates a second hook provided in the housing in a second direction, wherein the first and second directions are opposite one another and the first and second lever arms are connected to one another via the actuation means such that a support section is formed that has a parabolic form with two parallel limbs.

In accordance with a preferred embodiment, the first and second hooks are arranged disposed opposite one another in the housing. This has the advantage that the latching elements are provided directly at the housing so that the fastening apparatus per se has fewer elements.

Furthermore, in accordance with a further preferred embodiment, the first and second lever arms are arranged next to one another in the region of the first and second hooks such that the first and second lever arms lie in the same plane, with the first lever arm surrounding the second lever arm or vice versa. A compact formation of the fastening apparatus is hereby achievable.

The first and second lever arms are advantageously coaxially movable in opposite directions when the actuation means is actuated. The advantage thereby results that both hooks are moved synchronously and coaxially in opposite directions on an actuation of the actuation means. In other words, this means that both hooks are simultaneously moved into an open or into a closed position so that the fastening of the housing to the fastening rail can take place intuitively. The movement of the two hooks in opposite coaxial directions furthermore has the advantage that the housing can be installed without a tilt to or from the fastening rail if both hooks are moved into the open position by an actuation of the actuation means.

In accordance with a further preferred embodiment, the first and second lever arms each have a groove that is formed with shape matching with respect to an end of the respective hook. In other words, the hooks are connected to the housing one the one hand and each have a movable end on the other hand that is formed with shape matching with respect to the respective groove of the first and second lever arms respectively so that the lever arms can be placed onto the ends of the hooks with shape matching. This enables a simple installation of the lever mechanism at the housing. The lever mechanism is advantageously produced in part from a flexible material. The manufacture of the lever mechanism is hereby simple and inexpensive.

In accordance with a further preferred embodiment, the lever mechanism is formed as flexible in the region of the support section and as inflexible in the region of the hooks so that an exact latching or unlatching of the housing is possible.

Furthermore, in accordance with a preferred embodiment, the first and second lever arms are thick-walled in the region of the respective hooks and are thin-walled in the region of the support section. The lever mechanism is preferably arranged with shape matching in a form provided in the housing. An attachment of the fastening apparatus to the housing can hereby be carried out simply.

It is furthermore an object of the invention to provide a safety control, in particular a modular safety control, that can be simply releasably installed at a fastening rail.

The object is achieved in accordance with the invention by a security control having a fastening apparatus for the releasable fastening of a housing to a fastening rail comprising a single-part lever mechanism for latching and unlatching the housing to or from the fastening rail, wherein the lever mechanism comprises an actuation means that moves the lever mechanism into a latching position or an unlatching position; a first lever arm that actuates a first hook provided in the housing in a first direction; and a second lever arm that actuates a second hook provided in the housing in a second direction, wherein the first and second directions are opposite one another and the first and second lever arms are connected to one another via the actuation means such that a support section is formed that has a parabola-like form with two parallel limbs.

Preferred embodiments and further developments as well as further advantages of the invention can be seen from the dependent claims, from the following description and from the drawings.

BRIEF DESCRIPTION OF THE DRAWINGS

The invention will also be explained in the following with respect to further advantages and features with reference to the enclosed drawing and to embodiments. The Figures of the drawing show in.

DETAILED DESCRIPTION

Figure 1:
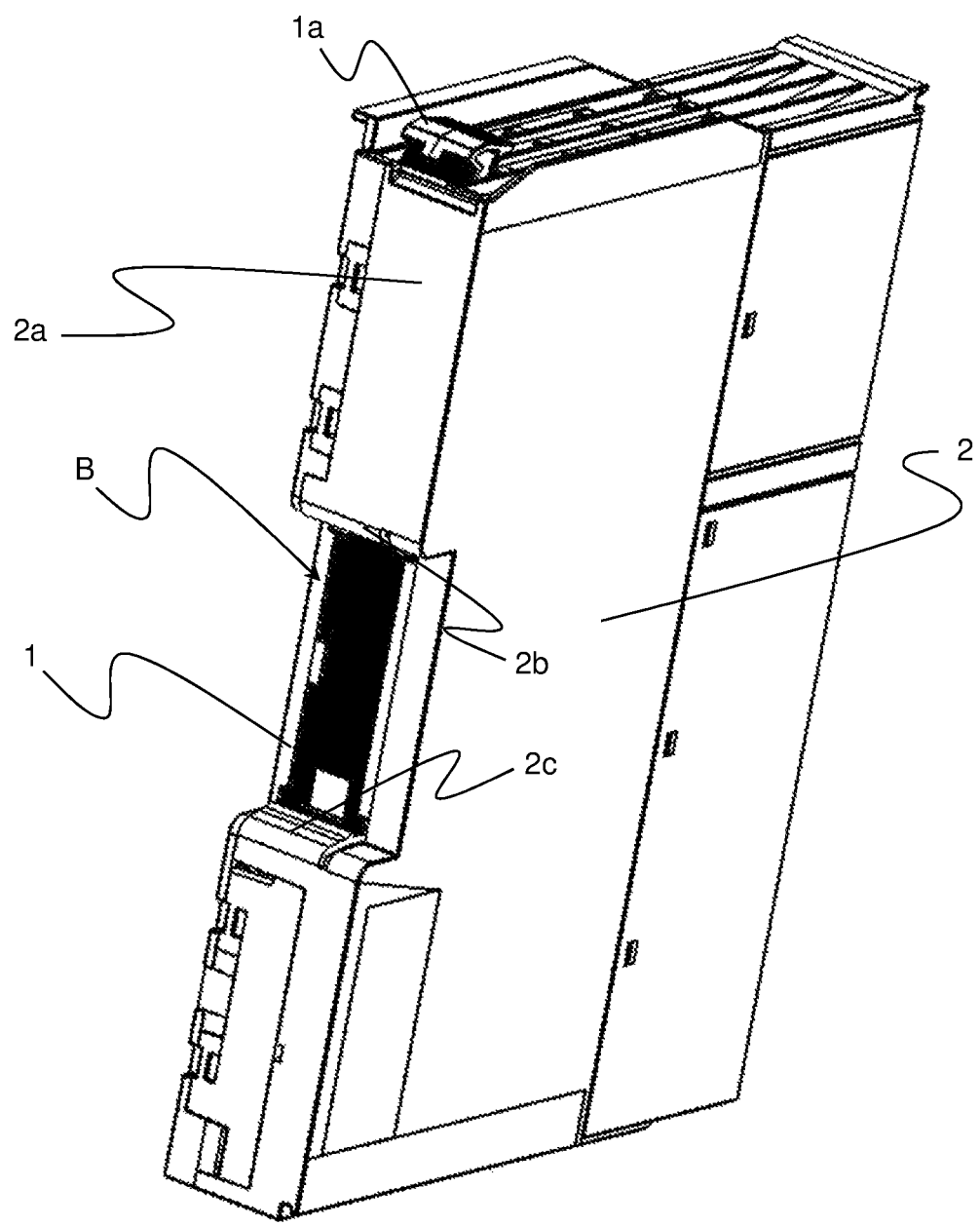
FIG. 1 a schematic perspective part representation of a housing with a fastening apparatus in accordance with the invention contained therein.

FIG. 1 shows a schematic perspective part representation of a fastening apparatus B in accordance with the invention in the installed state in a rear wall 2a of a housing 2. The housing 2 in the embodiment here encompasses a module of a modular safety control. A plurality of such housings 2 of modules of the modular safety control can be arranged next to one another, with the modules being laterally electrically connectable to one another.

The rear wall 2a of the housing 2 can be installed at a fastening rail, not shown, by means of the fastening apparatus B, with the fastening rail preferably comprising a top-hat rail or a sectional rail. The fastening rail is here arrangeable in a free step 3 at the rear wall 2a of the housing 2, with the fastening apparatus B extending along the free step 3.

The fastening apparatus B comprises a single-part lever mechanism 1 for latching and unlatching the housing 2 to and from the fastening rail. The lever mechanism 1 has an actuation means 1a that moves the lever mechanism 1 into a latching position V or into an unlatching position E. In the latching position V, the lever mechanism 1 latches the housing 2 to the fastening rail. In the unlatching position E, the lever mechanism 1 unlatches the housing 2 from the fastening rail so that the housing 2 is releasable and removable from the fastening rail.

Figure 2:
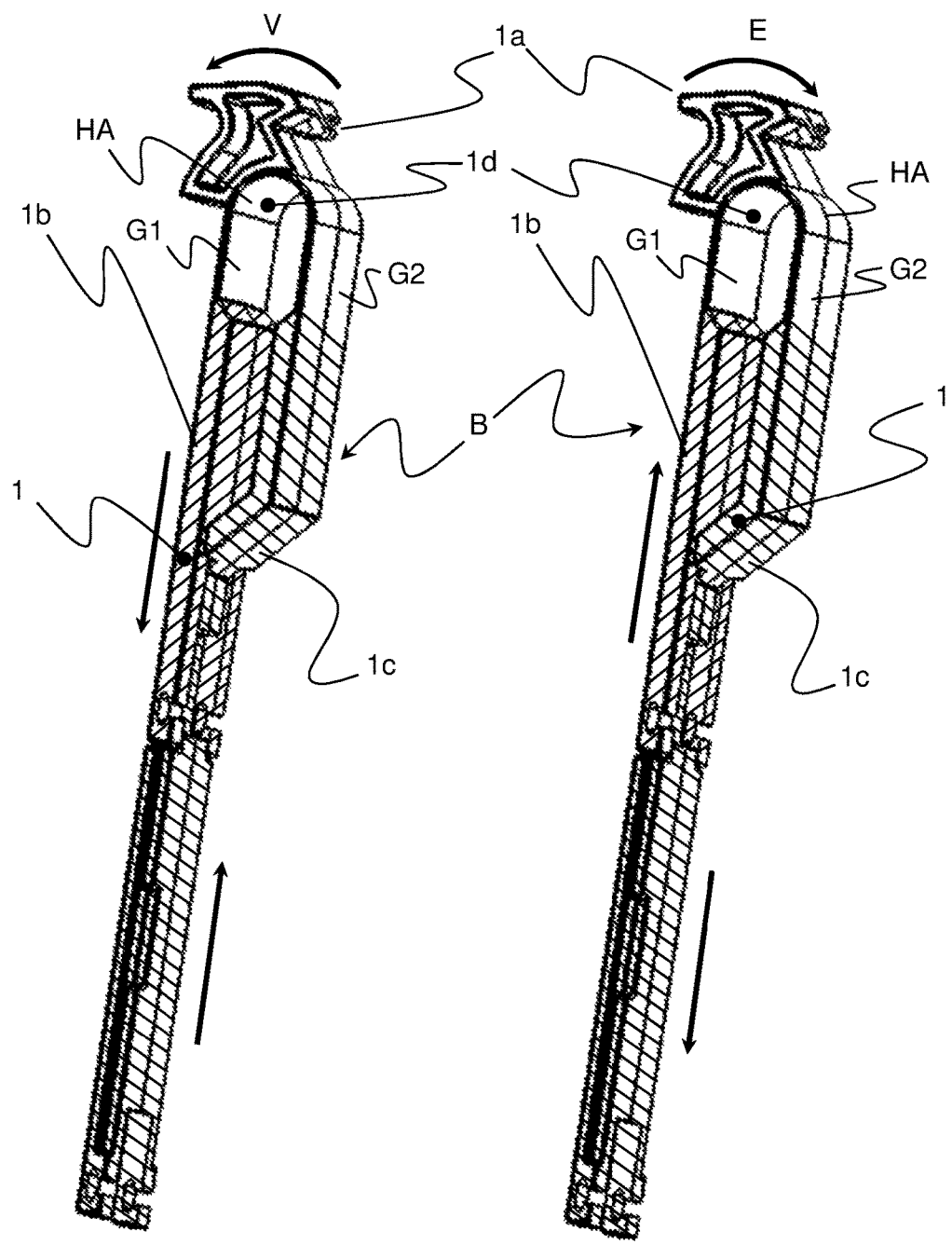
FIG. 2 a perspective detailed representation of the fastening apparatus in accordance with the invention.

For this purpose, the lever mechanism 1 has, as shown in a perspective detailed representation of the fastening apparatus B in accordance with the invention in FIG. 2, a first lever arm 1b and a second lever arm 1c. In this respect, the first and second lever arms 1b and 1c are connected to one another via the actuation means 1a such that on an actuation of the actuation means 1a in one direction, the first lever arm 1b is moved in a first direction and the second lever arm 1d is moved in a second direction, with the first and second directions of the first and second lever arms 1b and 1c being opposite one another.

In other words, if the actuation means 1a is moved into the latching position V, on its movement, the first lever arm 1b actuates a first hook 2b provided in the housing 2 and shown in FIG. 1 in the first direction. At the same time, on its movement, the second lever arm 1c actuates a second hook 2c provided in the housing 2 and shown in FIG. 1 in the second direction. The first and second hooks 2c and 2c latch the housing 2 to the fastening rail in this latching position V, with the first and second hooks 2b and 2c in particular being arranged opposite one another in the housing 2. This means, with respect to a direction of movement of the first and second lever arms 1b and 1c, that the first and second hooks 2b and 2c are arranged along the direction of movement.

If the actuation means 1a is moved into the unlatching position E, on its movement, the first lever arm 1b actuates the first hook 2 in a direction opposite to the first direction. At the same time, on its movement, the second lever arm 1c actuates the second hook 2c in a direction opposite to the second. The first and second hooks 2b and 2c hereby unlatch the housing 2 from the fastening rail in this unlatching position E.

Figure 3:
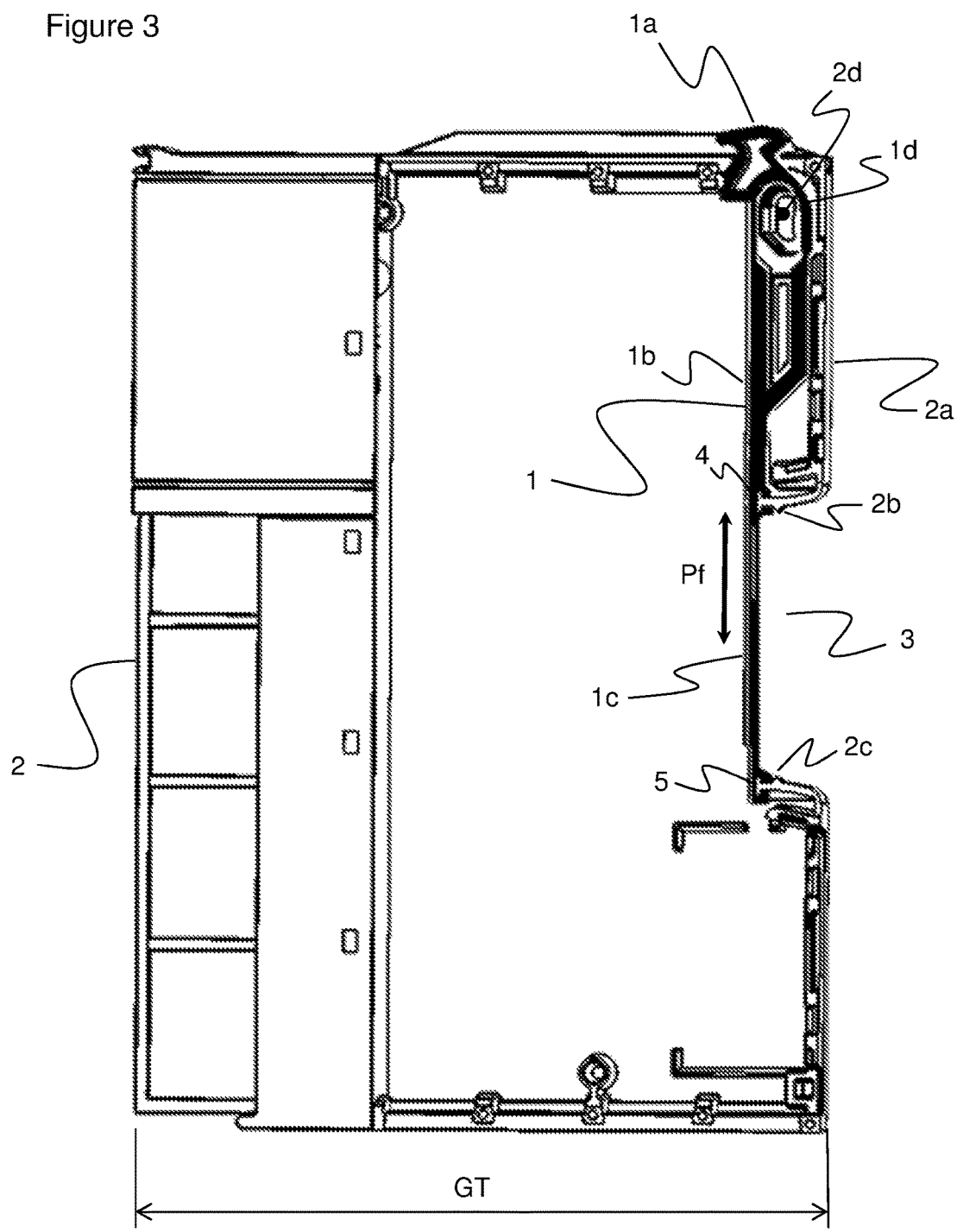
FIG. 3 a lateral detailed representation of the fastening apparatus in accordance with the invention in the state installed in the housing.

Since the first and second hooks 2b and 2c are moved synchronously and coaxially into the unlatching position E, the housing 2 can advantageously be removed without a tilting perpendicular to the fastening rail. This simplified handling becomes particularly clear when, for example, a plurality of housings are arranged next to one another on a fastening rail and above one another on a plurality of fastening rails arranged in parallel above one another so that there is no room for a tilt of the housing 2. A straight removal of the housing 2 from the fastening rail is above all advantageous and is necessary with fastening rails arranged above one another when the housing 2 has, as shown in FIG. 3, a housing depth GT.

The first and second lever arms 1b and 1c are furthermore connected to one another via the actuation means 1a such that a support section 1d is formed. The support section 1d has a parabolic form with two parallel limbs. This means that the parabolic form has a semicircular section HA to which the fastening means 1a is connected and two straight limb sections G1 and G2 that extend in parallel, that adjoin the semicircular section HA, and that form the limbs such that the semicircular section HA and the two straight limb sections G1 and G2 extending in parallel together form the support section 1d.

The first and second lever arms 1b and 1c directly adjoin the respective straight limb sections G1 and G2 extending in parallel. The first and second lever arms 1b and 1c are here preferably arranged directly next to one another in the region of the first and second hooks 2b and 2c such that the first and second lever arms 1b and 1 c are in the same plane so that a slim contour of the lever mechanism 1 is made possible.

The first lever arm 1b has two part arms that surround the second lever arm 1c such that the second lever arm 1c moves between the two part arms of the first lever arm 1b and relative to the first lever arm 1b when the lever mechanism 1 is actuated. Unlike the representation in FIG. 3, the embodiment of the two lever arms 1b and 1c can also be designed vice versa. This means that the second lever arm 1c has two part arms and the first lever arm 1b is arranged between the two part arms of the second lever arm 1c.

As shown in FIG. 3, the lever mechanism 1 is arranged with shape matching with respect to a plane that extends in parallel with the housing depth GT of the housing 2 in a form provided in the housing 2, with the support section 1d surrounding a step 2d of the housing 2. A movement of the lever mechanism 1 is hereby prevented in a direction extending coaxially to the housing depth GT of the housing 2. A movement of the lever mechanism 1 in the form and perpendicular to the housing depth GT of the housing 2 along an arrow Pf shown in FIG. 3 is possible to move the first and second lever arms 1b and 1c into the latching position V or into the unlatching position E so that a guided movement of the lever mechanism 1 is made possible.

On the actuation of the lever mechanism 1 into the latching or unlatching position V and E respectively, the parabolic form of the bearing section 1d deforms so that the support section 1d slides in a rotating manner along the step 2d in the direction of the actuation and thus the two straight limb sections G1 and G2 move in opposite directions. The two lever arms 1b and 1c of the lever mechanism 1 can move upwardly or downwardly along the shown arrow Pf with respect to the shown side position of the housing 2.

The first lever arm 1b has a groove 4 at one end for a shape-matched reception of an end of the first hook 2b. The second lever arm 1c likewise has a groove 5 at its free end for a shape-matched reception of an end of the second hook 2c. As soon as the lever arms 1b and 1d are moved in the first or second directions respectively, or also vice versa, by actuation of the actuation means 1a, the first and second hooks 2b and 2c correspondingly held by means of the ends received in the grooves 4 and 5 are moved along to latch or unlatch the housing 2.

The lever mechanism 1 is partly produced from a flexible material and by an injection process. The support section 1d and in particular its two parallel limbs or the two straight limb sections G1 and G2 of the parabolic form extending in parallel are formed as thin-walled, whereby the lever mechanism 1 is formed, in particular in the region of the support section 1d, as flexible and thus as easily movable.

The lever mechanism 1, in particular the first and second lever arms 1b and 1c, are thick-walled and thus inflexible or more rigid than the support section 1d in the region of the first and second hooks 2b and 2c of the housing 2. It is hereby ensured that the first and second lever arms 1b and 1c move the first and second hooks 2b and 2c in a shape-matching manner and free of clearance in accordance with the actuation of the actuation means 1a into the respective latching and unlatching positions V and E respectively.

After the manufacture of the lever mechanism 1, the lever mechanism 1 is placed into the form provided in the housing 2, as shown in FIG. 3, so that the grooves 4 and 5 engage around the respective ends of the first and second hooks 2b and 2c and the support section 1d surrounds the step 2d of the housing 2.

On the placing on of a side wall, not shown, of the housing 2, the lever mechanism 1 is surrounded and the fastening apparatus B in accordance with the invention is formed. The side wall prevents a release of the fastening apparatus B from the provided form of the housing 2. The assembly of the fastening apparatus B is simple to handle and the operation of the lever mechanism 1 is intuitive.

REFERENCE NUMERAL LIST

B fastening apparatus
1 lever mechanism
1a actuation means
1b, 1c first and second lever arms
1d support section
2 housing
2a rear wall
2b and 2c first and second hooks
2d step
3 free step
4, 5 groove
E unlatching position
G1, G2 straight lines extending in parallel
GT housing depth of the housing 2
HA semicircular section
Pf arrow
V latching position

The invention claimed is:

1. A fastening apparatus for the releasable fastening of a housing to a fastening rail, the fastening apparatus comprising:
a single-part lever mechanism for latching and unlatching the housing to and from the fastening rail, wherein the lever mechanism comprises:
actuation means that moves the lever mechanism into one of a latching position and an unlatching position;
a first lever arm that actuates a first hook provided in the housing in a first direction; and
a second lever arm that actuates a second hook provided in the housing in a second direction,
wherein the first and second directions are opposite one another and the first and second lever arms are connected to one another via the actuation means such that a support section is formed that has a parabolic form having two parallel limbs,
and wherein each limb has a straight limb section and the first and second lever arms are directly connected to the straight parallel limb sections, respectively, so that the limb sections and the first and second connected lever arms are coaxially movable.

2. The fastening apparatus in accordance with claim 1, wherein the first and second hooks are arranged opposite one another in the housing.

3. The fastening apparatus in accordance with claim 1, wherein the first and second lever arms are arranged next to one another in the region of the first and second hooks such that at least a portion of the first lever arm and at least a portion of the second lever arm are in the same plane, with the portion of the first lever arm surrounding the second lever arm on two sides of the second lever arm, or vice versa.

4. The fastening apparatus in accordance with claim 1, wherein the first and second lever arms are coaxially movable in opposite directions when the actuation means is actuated.

5. The fastening apparatus in accordance with claim 1, wherein the first and second lever arms each have a groove that is formed with shape matching with respect to an end of the respective hook.

6. The fastening apparatus in accordance with claim 1, wherein the lever mechanism is partly produced from a flexible material.

7. The fastening apparatus in accordance with claim 6, wherein the lever mechanism is flexible in the region of the support section and inflexible in the region of the first and second hooks.

8. The fastening apparatus in accordance with claim 1, wherein the first and second lever arms are thick-walled in the region of the respective first and second hooks and the support section is thin-walled.

9. The fastening apparatus in accordance with claim 1, wherein the lever mechanism is arranged with shape matching in a form provided in the housing with respect to a plane that extends in parallel with a housing depth of the housing.

10. A safety control having a fastening apparatus for the releasable fastening of a housing to a fastening rail, the fastening apparatus comprising:
a housing encompassing a module of a modular safety control,
a single-part lever mechanism fixed to or contained within the housing for latching and unlatching the housing to and from the fastening rail, wherein the lever mechanism comprises:
actuation means that moves the lever mechanism into one of a latching position and an unlatching position;
a first lever arm that actuates a first hook provided in the housing in a first direction; and
a second lever arm that actuates a second hook provided in the housing in a second direction, wherein the first and second directions are opposite one another and the first and second lever arms are connected to one another via the actuation means such that a support section is formed that has a parabolic form having two parallel limbs, and wherein each limb has a straight limb section and the first and second lever arms are directly connected to the straight parallel limb sections, respectively, so that the limb sections and the first and second connected lever arms are coaxially movable.

* * * * *